United States Patent
Jenkins et al.

(10) Patent No.: US 7,603,964 B2
(45) Date of Patent: Oct. 20, 2009

(54) COMPOSITE PARTICLE ANIMAL LITTER AND METHOD THEREOF

(75) Inventors: Dennis B. Jenkins, Pleasanton, CA (US); Charles F. Fritter, Pleasanton, CA (US); Ananth N. Shenoy, Pleasanton, CA (US)

(73) Assignee: The Clorox Company, Oakland, CA (US)

( * ) Notice: Subject to any disclaimer, the term of this patent is extended or adjusted under 35 U.S.C. 154(b) by 80 days.

(21) Appl. No.: 11/119,204

(22) Filed: Apr. 29, 2005

(65) Prior Publication Data

US 2006/0243212 A1    Nov. 2, 2006

(51) Int. Cl.
  *A01K 1/01* (2006.01)
(52) U.S. Cl. .................................. 119/171; 119/173
(58) Field of Classification Search ............... 119/171, 119/172, 173
See application file for complete search history.

(56) References Cited

U.S. PATENT DOCUMENTS

| | | | |
|---|---|---|---|
| 29,783 | A | 8/1860 | Harris |
| 33,983 | A | 12/1861 | Cauhaupe |
| 3,029,783 | A | 4/1962 | Sawyer, Jr. et al. |
| 3,035,301 | A * | 5/1962 | Hinz et al. ............ 264/69 |
| 3,059,615 | A | 10/1962 | Kuceski et al. |
| 3,776,188 | A | 12/1973 | Komakine |
| 3,789,797 | A | 2/1974 | Brewer |
| 3,821,346 | A | 6/1974 | Batley, Jr. |
| 3,892,846 | A | 7/1975 | Wortham |
| 3,898,324 | A | 8/1975 | Komakine |
| 3,921,581 | A * | 11/1975 | Brewer ............ 119/173 |
| 3,993,584 | A | 11/1976 | Owen et al. |
| 4,059,545 | A | 11/1977 | Corbett et al. |
| 4,085,704 | A | 4/1978 | Frazier |
| 4,097,418 | A * | 6/1978 | Rolfes ............ 510/534 |
| 4,187,803 | A | 2/1980 | Valenta |
| 4,256,728 | A | 3/1981 | Nishino et al. |
| 4,263,873 | A | 4/1981 | Christianson |
| 4,275,684 | A | 6/1981 | Kramer et al. |
| 4,306,516 | A | 12/1981 | Currey |
| 4,387,653 | A * | 6/1983 | Voss ............ 423/230 |
| 4,407,231 | A | 10/1983 | Colborn et al. |
| 4,437,429 | A | 3/1984 | Goldstein et al. |
| 4,482,630 | A * | 11/1984 | Allen et al. ............ 510/530 |
| 4,506,628 | A | 3/1985 | Stockel |
| 4,517,308 | A | 5/1985 | Ehlenz et al. |

(Continued)

FOREIGN PATENT DOCUMENTS

EP    0573303    8/1993

(Continued)

*Primary Examiner*—Yvonne R. Abbott
(74) *Attorney, Agent, or Firm*—Ann Lee

(57) ABSTRACT

Composites and methods for making the same. A mixture of clay material and a light-weighting material is formed into a composite particle. An optional performance-enhancing active is coupled to the composite particle material before, during, or after the particle-forming process, homogeneously and/or in layers. Preferred methods for creating the composites include a pan agglomeration process, a high shear agglomeration process, a low shear agglomeration process, a high pressure agglomeration process, a low pressure agglomeration process, a rotary drum agglomeration process, a mix muller process, a roll press compaction process, a pin mixer process, a batch tumble blending mixer process, an extrusion process, and a fluid bed process.

26 Claims, 6 Drawing Sheets

▲ PERFORMANCE ENHANCING ACTIVE PARTICLE
○ CLAY PARTICLE
□ LIGHT-WEIGHTING PARTICLE

U.S. PATENT DOCUMENTS

| | | | |
|---|---|---|---|
| 4,560,527 A | 12/1985 | Harke et al. | |
| 4,565,794 A | 1/1986 | de Buda | |
| 4,568,453 A | 2/1986 | Lowe, Jr. | |
| 4,591,581 A | 5/1986 | Crampton et al. | |
| 4,607,594 A | 8/1986 | Thacker | |
| 4,621,011 A | 11/1986 | Fleischer et al. | |
| 4,638,763 A | 1/1987 | Greenberg | |
| 4,641,605 A | 2/1987 | Gordon | |
| 4,657,881 A | 4/1987 | Crampton et al. | |
| 4,664,843 A | 5/1987 | Burba, III et al. | |
| 4,677,086 A | 6/1987 | McCue et al. | |
| 4,704,989 A | 11/1987 | Rosenfeld | |
| 4,715,979 A * | 12/1987 | Moore et al. | 510/297 |
| 4,721,059 A | 1/1988 | Lowe et al. | |
| 4,793,837 A | 12/1988 | Pontius | |
| 4,824,810 A | 4/1989 | Lang et al. | |
| 4,837,020 A | 6/1989 | Mise et al. | |
| 4,844,010 A | 7/1989 | Ducharme et al. | |
| 4,866,023 A | 9/1989 | Ritter et al. | |
| 4,881,490 A | 11/1989 | Ducharme et al. | |
| 4,914,066 A | 4/1990 | Woodrum | |
| 4,920,090 A | 4/1990 | Ritter et al. | |
| 4,949,672 A | 8/1990 | Ratcliff et al. | |
| 5,000,115 A | 3/1991 | Hughes | |
| 5,005,520 A | 4/1991 | Michael | |
| 5,013,335 A | 5/1991 | Marcus | |
| 5,014,650 A | 5/1991 | Sowle et al. | |
| 5,018,482 A | 5/1991 | Stanislowski et al. | |
| 5,019,254 A | 5/1991 | Abrevaya et al. | |
| 5,032,549 A | 7/1991 | Lang et al. | |
| 5,054,434 A * | 10/1991 | Wax et al. | 119/171 |
| 5,062,383 A | 11/1991 | Nelson | |
| 5,079,201 A | 1/1992 | Chu et al. | |
| 5,094,189 A | 3/1992 | Aylen et al. | |
| 5,094,190 A | 3/1992 | Ratcliff et al. | |
| 5,100,600 A | 3/1992 | Keller et al. | |
| 5,101,771 A | 4/1992 | Goss | |
| 5,109,805 A | 5/1992 | Baldry et al. | |
| 5,129,365 A | 7/1992 | Hughes | |
| 5,135,743 A | 8/1992 | Stanislowski et al. | |
| 5,143,023 A | 9/1992 | Kuhns | |
| 5,146,877 A | 9/1992 | Jaffee et al. | |
| 5,152,250 A | 10/1992 | Loeb | |
| 5,176,107 A | 1/1993 | Buschur | |
| 5,176,108 A | 1/1993 | Jenkins et al. | |
| 5,176,879 A | 1/1993 | White et al. | |
| 5,183,010 A | 2/1993 | Raymond et al. | |
| 5,183,655 A | 2/1993 | Stanislowski et al. | |
| 5,188,064 A * | 2/1993 | House | 119/172 |
| 5,193,489 A | 3/1993 | Hardin | |
| 5,196,473 A | 3/1993 | Valenta et al. | |
| 5,204,310 A | 4/1993 | Tolles et al. | |
| 5,206,207 A | 4/1993 | Tolles | |
| 5,207,830 A | 5/1993 | Cowan et al. | |
| 5,210,112 A | 5/1993 | Shimoda et al. | |
| 5,228,895 A * | 7/1993 | Kelly et al. | 71/63 |
| 5,230,305 A | 7/1993 | House | |
| 5,232,627 A | 8/1993 | Burba, III et al. | |
| 5,238,470 A | 8/1993 | Tolles et al. | |
| 5,250,491 A | 10/1993 | Yan | |
| 5,276,000 A | 1/1994 | Matthews et al. | |
| 5,279,259 A | 1/1994 | Rice et al. | |
| 5,304,527 A | 4/1994 | Dimitri | |
| 5,317,990 A | 6/1994 | Hughes | |
| 5,318,953 A | 6/1994 | Hughes | |
| 5,320,066 A | 6/1994 | Gunter | |
| 5,325,816 A | 7/1994 | Pattengill et al. | |
| 5,329,880 A | 7/1994 | Pattengill et al. | |
| 5,339,769 A | 8/1994 | Toth et al. | |
| 5,345,787 A | 9/1994 | Piltingsrud | |
| 5,359,961 A | 11/1994 | Goss et al. | |
| 5,361,719 A | 11/1994 | Kiebke | |
| 5,386,803 A | 2/1995 | Hughes | |
| 5,389,325 A | 2/1995 | Bookbinder et al. | |
| 5,407,442 A | 4/1995 | Karapasha | |
| 5,421,291 A * | 6/1995 | Lawson et al. | 119/173 |
| 5,450,817 A | 9/1995 | Hahn et al. | |
| 5,452,684 A | 9/1995 | Elazier-Davis et al. | |
| 5,458,091 A | 10/1995 | Pattengill et al. | |
| 5,469,809 A | 11/1995 | Coleman | |
| 5,480,584 A | 1/1996 | Urano et al. | |
| 5,503,111 A | 4/1996 | Hughes | |
| 5,529,022 A | 6/1996 | Nelson | |
| 5,538,932 A | 7/1996 | Yan et al. | |
| 5,542,374 A | 8/1996 | Palmer, Jr. | |
| 5,566,642 A | 10/1996 | Ochi | |
| 5,577,463 A | 11/1996 | Elazier-Davis et al. | |
| 5,579,722 A | 12/1996 | Yamamoto et al. | |
| 5,609,123 A | 3/1997 | Luke et al. | |
| 5,634,431 A | 6/1997 | Reddy et al. | |
| 5,638,770 A * | 6/1997 | Peleties | 119/173 |
| 5,641,482 A * | 6/1997 | Sugo | 424/76.6 |
| 5,647,300 A | 7/1997 | Tucker | |
| 5,648,306 A | 7/1997 | Hahn et al. | |
| 5,655,480 A | 8/1997 | Steckel | |
| 5,664,523 A | 9/1997 | Ochi et al. | |
| 5,680,830 A | 10/1997 | Kawaguchi et al. | |
| 5,691,270 A | 11/1997 | Miller | |
| 5,735,232 A * | 4/1998 | Lang et al. | 119/171 |
| 5,736,481 A | 4/1998 | Miller | |
| 5,736,485 A | 4/1998 | Miller | |
| 5,740,761 A | 4/1998 | Lee et al. | |
| 5,743,213 A | 4/1998 | Fujiura | |
| 5,762,023 A | 6/1998 | Carter | |
| 5,775,259 A | 7/1998 | Tucker | |
| 5,806,462 A | 9/1998 | Parr | |
| 5,826,543 A | 10/1998 | Raymond et al. | |
| 5,836,263 A | 11/1998 | Goss et al. | |
| 5,860,391 A | 1/1999 | Maxwell et al. | |
| 5,863,858 A | 1/1999 | Miller et al. | |
| 5,901,661 A | 5/1999 | Pattengill et al. | |
| 5,944,704 A | 8/1999 | Guarracino et al. | |
| 5,950,325 A * | 9/1999 | Mehdizadeh et al. | 34/256 |
| 5,970,915 A | 10/1999 | Schlueter et al. | |
| 5,975,019 A | 11/1999 | Goss et al. | |
| 5,992,351 A | 11/1999 | Jenkins | |
| 6,019,063 A | 2/2000 | Haubensak et al. | |
| 6,025,319 A | 2/2000 | Surutzidis et al. | |
| 6,030,565 A | 2/2000 | Golan | |
| 6,039,004 A | 3/2000 | Goss et al. | |
| 6,080,908 A | 6/2000 | Guarracino et al. | |
| 6,089,189 A | 7/2000 | Goss et al. | |
| 6,089,190 A | 7/2000 | Jaffee et al. | |
| 6,101,978 A | 8/2000 | Steckel | |
| 6,194,065 B1 | 2/2001 | Golan | |
| 6,206,947 B1 * | 3/2001 | Evans et al. | 71/63 |
| 6,216,634 B1 | 4/2001 | Kent et al. | |
| 6,220,206 B1 | 4/2001 | Sottillo et al. | |
| 6,260,511 B1 | 7/2001 | Hsu | |
| 6,276,300 B1 | 8/2001 | Lewis, II et al. | |
| 6,287,550 B1 | 9/2001 | Trinh et al. | |
| 6,294,118 B1 | 9/2001 | Huber et al. | |
| 6,308,658 B1 | 10/2001 | Steckel | |
| 6,319,342 B1 | 11/2001 | Riddell | |
| 6,371,050 B1 | 4/2002 | Mochizuki | |
| 6,405,677 B2 | 6/2002 | McPherson et al. | |
| 6,405,678 B2 | 6/2002 | Ikegami et al. | |
| 6,426,325 B1 | 7/2002 | Dente et al. | |
| 6,472,343 B1 | 10/2002 | McCrae et al. | |
| 6,499,984 B1 | 12/2002 | Ghebre-Sellassie et al. | |
| 6,543,385 B2 | 4/2003 | Raymond | |
| 6,578,521 B2 | 6/2003 | Raymond et al. | |
| 6,659,042 B2 * | 12/2003 | Bloomer | 119/172 |
| 6,677,399 B2 * | 1/2004 | Herbert et al. | 524/547 |

| | | | |
|---|---|---|---|
| 6,740,406 B2 | 5/2004 | Hu et al. | |
| 6,830,603 B2 * | 12/2004 | Whitehurst et al. | 71/28 |
| 6,895,896 B1 * | 5/2005 | Bloomer | 119/173 |
| 7,261,742 B2 * | 8/2007 | Leskowicz | 8/137 |
| 2001/0018308 A1 | 8/2001 | Quick et al. | |
| 2001/0049514 A1 | 12/2001 | Dodge, II et al. | |
| 2002/0000207 A1 | 1/2002 | Ikegami et al. | |
| 2002/0007800 A1 | 1/2002 | Ochi et al. | |
| 2002/0014209 A1 | 2/2002 | Bloomer | |
| 2002/0054919 A1 | 5/2002 | Hochwalt et al. | |
| 2002/0117117 A1 | 8/2002 | Raymond et al. | |
| 2002/0153311 A1 | 10/2002 | Farquhar Davidson | |
| 2002/0183201 A1 | 12/2002 | Barnwell et al. | |
| 2003/0051673 A1 | 3/2003 | Raymond et al. | |
| 2003/0072733 A1 | 4/2003 | McGee et al. | |
| 2003/0131799 A1 | 7/2003 | Wong et al. | |
| 2003/0148100 A1 | 8/2003 | Greene et al. | |
| 2004/0069032 A1 * | 4/2004 | Krysiak et al. | 71/27 |
| 2004/0074271 A1 * | 4/2004 | Krysiak et al. | 71/27 |
| 2005/0005869 A1 * | 1/2005 | Fritter et al. | 119/173 |
| 2005/0005870 A1 * | 1/2005 | Fritter et al. | 119/173 |
| 2005/0025699 A1 * | 2/2005 | Reed et al. | 423/594.17 |
| 2006/0042515 A1 * | 3/2006 | Bodycomb et al. | 106/698 |

FOREIGN PATENT DOCUMENTS

| | | |
|---|---|---|
| JP | S62-239932 | 10/1987 |
| JP | 03078627 | 3/1991 |
| JP | 04287626(A) | 10/1992 |
| JP | 05160351 | 5/1993 |
| JP | 6-14669 | 1/1994 |
| JP | 06343362(A) | 12/1994 |
| JP | 07-041202 | 8/1996 |
| JP | 10-262482 | 10/1998 |
| WO | WO 90/09099 | 8/1990 |
| WO | WO 96/02129 A1 | 2/1996 |
| WO | WO 98/12291 | 3/1998 |
| WO | WO 98/27261 | 6/1998 |
| WO | WO 99/33335 | 7/1999 |
| WO | WO 99/40776 | 8/1999 |
| WO | WO 99/45764 | 9/1999 |
| WO | WO 02/056673 | 7/2002 |
| WO | WO 03/032719 | 4/2003 |

* cited by examiner

COMPOSITE PARTICLE ANIMAL LITTER AND METHOD THEREOF

FIELD OF THE INVENTION

The present invention relates to composite particles useful as animal litter having improved clumping and odor-inhibiting properties.

RELATED ART

Clay has long been used as a liquid absorbent, and has found particular usefulness as an animal litter. Clay has very poor odor-controlling qualities, and inevitably waste build-up leads to severe malodor production. One attempted solution to the malodor problem has been the introduction of granular activated carbon (GAC) (20-8 mesh) into the litter. U.S. Pat. No. 5,860,391 to Maxwell et al. discloses the use of activated carbon in cat litter.

The human objection to odor is not the only reason that it is desirable to reduce odors. Studies have shown that cats prefer litter with little or no smell. One theory is that cats like to mark their territory by urinating. When cats return to the litterbox and don't sense their odor, they will try to mark their territory again. The net effect is that cats return to use the litter box more often if the odor of their markings are reduced. What is needed is an absorbent material with improved odor-controlling properties, and that maintains such properties for longer periods of time.

SUMMARY OF THE INVENTION

An aspect of the invention includes a composite particle comprising: an agglomerated mixture of (1) a plurality of particles of at least one absorbent clay material and (2) a plurality of particles of at least one light-weighting material, said agglomerated mixture suitable for use as an animal litter; and optionally a plurality of particles of at least one performance-enhancing active incorporated into said agglomerated mixture.

Another aspect of the invention includes an animal litter comprising: the composite particle recited in Claim 1; and a plurality of particles selected from the group consisting of a plurality of composite particles formed by agglomerating at least one absorbent clay material, a plurality of non-agglomerated particles of at least one absorbent clay material, or a mixture thereof.

A further aspect of the invention includes a method of forming a composite particle comprising: providing a plurality of particles of an absorbent clay material; providing a plurality of particles of a light-weighting material; agglomerating said particles of absorbent clay material together with said particles of light-weighting material to form a plurality of composite particles; and sieving said composite particles to meet a predetermined particle size distribution.

Another aspect of the invention includes a composite particle comprising: an agglomerated mixture of a plurality of particles of bentonite and a plurality of particles selected from the group consisting of expanded vermiculite, expanded perlite, or a mixture thereof, said agglomerated mixture suitable for use as an animal litter; and optionally a plurality of particles of at least one performance-enhancing active incorporated into said agglomerated mixture.

Another aspect of the invention includes a composite particle comprising: an agglomerated mixture of a plurality of particles of bentonite and a plurality of particles selected from the group consisting of expanded vermiculite, expanded perlite, or a mixture thereof, said agglomerated mixture suitable for use as an animal litter; and a plurality of particles of activated carbon incorporated into said composite particle.

A further aspect of the invention includes a composite particle comprising: an agglomerated mixture of (1) a plurality of particles of at least one absorbent clay material and (2) a plurality of particles of at least one light-weighting material, said agglomerated mixture suitable for use as an animal litter; and a plurality of particles of activated carbon incorporated into said composite particle.

BRIEF DESCRIPTION OF THE DRAWINGS

For a fuller understanding of the nature and advantages of the present invention, reference should be made to the following detailed description read in conjunction with the accompanying drawings.

DETAILED DESCRIPTION

Figure 1:
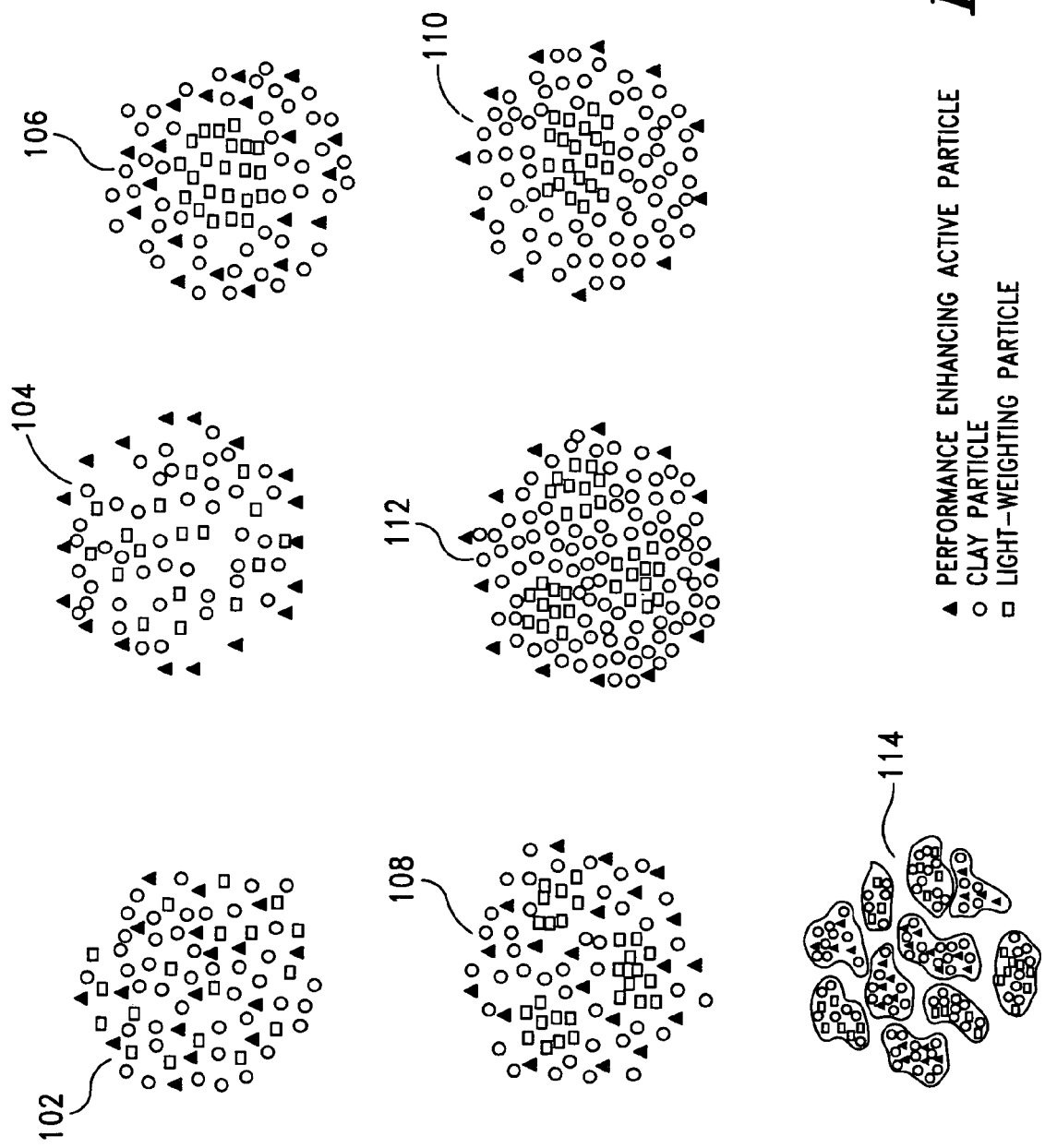
FIG. 1 illustrates several configurations of agglomerated composites according to various embodiments of the present invention.

Before describing the present invention in detail, it is to be understood that this invention is not limited to particularly exemplified systems or process parameters as such may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

All numbers expressing quantities of ingredients, constituents, reaction conditions, and so forth used in the specification and claims are to be understood as being modified in all instances by the term "about". Notwithstanding that the numerical ranges and parameters setting forth the broad scope of the subject matter presented herein are approximations, the numerical values set forth in the specific examples are reported as precisely as possible. All numerical values, however, inherently contain certain errors necessarily resulting from the standard deviation found in their respective testing measurements.

The following description includes embodiments presently contemplated for carrying out the present invention. This description is made for the purpose of illustrating the general principles of the present invention and is not meant to limit the inventive concepts claimed herein.

The present invention relates generally to composite particles, hereinafter referred to as composites, with improved physical and chemical properties that are useful as an animal litter. The composites of the present invention comprise a mixture of particles of an absorbent material(s), preferably an absorbent clay material(s), and particles of a light-weighting material(s). Light-weighting as defined herein means a material that causes a reduction in bulk density when compared to the bulk density of a comparably produced clay only material. Light-weighting materials may have other beneficial attributes in addition to providing for a decrease in bulk density. For example, as will be discussed in greater detail, composites containing expanded perlite stick less to the litter box when compared to their clay-only counterparts. Optionally, performance-enhancing active(s) may be added to the mixture. Performance-enhancing actives as defined herein mean any component that enhances the composite materials performance as an animal litter. Thus, light-weighting materials are one form of performance-enhancing active.

By using various processes described herein, such composites can be "engineered" to preferentially exhibit specific characteristics including but not limited to improved odor control, lower density, easier scooping, better particle/active consistency, higher clump strength, lower cost, etc. One of the many benefits of the technology disclosed herein is that the light-weighting material and/or the performance-enhancing actives may be positioned throughout the animal litter to optimally react with target molecules. For example, an odor-controlling active distributed correctly may react with odor-causing volatile substances such that the resulting odor control is achieved using surprisingly low levels of active ingredient.

One method of forming an embodiment of the animal litter of the present invention involves forming composites by agglomerating particles of an absorbent material(s) along with particles of a light-weighting material(s) and optionally a performance enhancing active(s). A second method involves forming two sets of composites by (1) agglomerating particles of an absorbent material(s) along with particles of a performance enhancing active(s) or by adding particles of a performance-enhancing active to the agglomerated absorbent material composites and (2) agglomerating particles of an absorbent material(s) along with particles of a light-weighting material(s) and optionally a different performance enhancing active(s) and then blending the two composites to form a blended composite animal litter. A third method involves forming composites by agglomerating particles of an absorbent material and a light-weighting material(s) and optionally a performance enhancing active(s) and blending the composites with either composites of an agglomerated absorbent material or blending the composites with a non-agglomerated absorbent material. The term "composite blend" will be used hereinafter to refer to embodiments created using the above-mentioned second and third methods.

Specific embodiments of agglomeration processes will be set forth in more detail below. Generally, agglomeration processes involve adding particles of absorbent material(s) and particles of light-weighting material(s) and/or performance-enhancing actives to an agglomerator. A fluid, e.g., water, or binder is usually added to the particles in the agglomerator. During the agglomeration process, the particles combine or coalesce to form composites. Controlled, predetermined agglomeration parameters are used to manipulate physical properties of the composites such as particle size, porosity, etc. The composites are then dried (if necessary) and collected.

Particles of one or more performance-enhancing active(s) may be added to the composites or a portion of the composites in an amount effective to perform the desired functionality or provide the desired benefit. These particles of active(s) can be added during the agglomeration process so that the actives are incorporated by agglomeration into the composite itself, or can be added during a later processing step.

As absorbent clay(s) is a preferred absorbent material, much of the discussion will involve the use of absorbent clay(s). However, it should be kept in mind that other absorbent materials suitable for use as animal litter may be used in place of the absorbent clay(s) discussed herein.

FIG. 1 shows several embodiments of the composites disclosed herein. Note that in all embodiments illustrated the performance enhancing active component is optional. Referring to FIG. 1:

102 shows clay particles, light-weighting particles and performance-enhancing actives homogeneously dispersed throughout the composite.

104 shows clay particles and light-weighting particles homogeneously dispersed throughout the composite with performance-enhancing active particles located on the outer edges or exposed surfaces of the composite.

106 shows light-weighting particles concentrated in the center of the composite forming a "core" with clay particles and performance-enhancing active particles homogeneously dispersed throughout the rest of the composite surrounding the light-weighting particle cores.

108 shows light-weighting particles concentrated in "cores" throughout the composite with clay particles and performance-enhancing active particles homogeneously dispersed throughout the rest of the composite.

110 shows light-weighting particles concentrated in the center of the composite forming a "core" with clay particles dispersed in a layer surrounding the light-weighting particle core and performance-enhancing active particles located on the outer edges of the composite.

112 shows light-weighting particles concentrated in "cores" throughout the composite with clay particles dispersed throughout the rest of the composite surrounding the light-weighting "cores" and performance-enhancing active particles located on the outer edges of the composite.

114 shows a blend of light-weighting particle/absorbent clay particle composites and performance-enhancing active particle/absorbent clay particle composites.

Further embodiments (not shown) comprise any one or more of the above-depicted composite embodiments blended with non-agglomerated absorbent materials, preferably clay(s).

Materials

As used herein particle size refers to sieve screen analysis by standard ASTM methodology (ASTM method D6913-04e1).

Many liquid-absorbing clay materials may be used without departing from the spirit and scope of the present invention. Illustrative absorbent clay materials include but are not limited to bentonites, attapulgite, montmorillonite diatomaceous earth, Georgia White clay, sepiolite, slate, pumice, tobermite, marls, kaolinite, halloysite, smectite, hectorite, Fuller's earth, zeolites and mixtures thereof. Various embodiments of the present invention utilize clay materials having the following mean particle diameters: about 5000 microns or less; about 3000 microns or less; ranging from about 25 to about 150 microns.

In addition to liquid-absorbing clay materials, filler materials such as limestone, sand, calcite, dolomite, recycled waste materials, zeolites, and gypsum can also be incorporated with the clay materials to reduce the cost of the litter without significantly decreasing the material's performance as a litter.

Because clays are heavy, it may be desirable to reduce the weight of the composites to reduce shipping costs, reduce the amount of material needed to fill the same relative volume of the litter box, and to make the material easier for customers to carry. Exemplary light-weighting materials include but are not limited to perlite, expanded perlite, volcanic glassy materials having high porosities and low densities, vermiculite, expanded vermiculite, pumice, silica gels, opaline silica, tuff, and lightweight agricultural byproducts. When selecting a light-weighting material, the effect the light-weighting material will have on the litter's performance is an important consideration. Factors to evaluate include how the light-weighting material will effect cost, ease of manufacture, clumping, tracking, absorbency, odor control, sticking to the box, dust, etc. In some cases, the light-weighting materials may also be performance-enhancing.

One embodiment disclosed herein utilizes expanded perlite having a bulk density of 5 lb/ft$^3$. Expanded perlites having bulk densities greater than 5 lb/ft$^3$ may also be used. Perlite is a generic term for a naturally occurring siliceous rock. The distinguishing feature which sets perlite apart from other volcanic glasses is that when heated to a suitable point in its softening range, it expands from four to twenty times its original volume. This expansion is due to the presence of two to six percent combined water in the crude perlite rock. Firing, i.e., quickly heating to above 1600° F. (871° C.), causes the crude rock to pop in a manner similar to popcorn yielding a very open, highly porous structure referred to as expanded perlite. Once the perlite is expanded, it can then be gently crushed to form materials having varying structural properties. The perlite can be obtained either expanded or unexpanded and the firing step can be performed on site prior to agglomeration. Significant cost savings in shipping can result from expanding the perlite on site.

A particular source of perlite is Kansas Minerals. Perlite obtained from Kansas Minerals is believed to be somewhat physically unique after being popped. It is expected that hollow spheres are formed during the firing process, however, when the Kansas Minerals material is examined under a microscope, it appears as though only a portion of the material comprises hollow spheres. The other portion comprises broken spheres. Without being bound by any particular theory, it is possible that the wall thickness of the expanded perlite spheres initially formed through the firing process are very thin and thus, tend to break apart. Whatever the cause of this physical property, it is believed to result in a material that is particularly well suited for use in the agglomeration processes of the present invention. The combination of approximately 50/50 hollow spheres to broken spheres has been observed to perform particularly well.

Another suitable, expandable mineral similar to perlite is vermiculite. In all examples containing expanded perlite, expanded vermiculite could be substituted for the perlite with similar results expected.

Various embodiments of the present invention utilize light-weighting materials having the following mean particle diameters: about 1500 microns or less; about 500 microns or less; ranging from about 1 to about 100 microns.

Using the above lightweight materials, a bulk density reduction of 10-50% can be achieved relative to generally solid particles of the absorbent clay material (e.g., as mined). For example, composites in which sodium bentonite (Black Hills Bentonite, Mills, Wyo.) is the absorbent clay material (bulk density 67 lb/ft$^3$), using about 17% of expanded perlite, e.g., Kamco 5, (Kansas Minerals, Mancato, Kans.) having a bulk density of 5 lb/ft$^3$ results in up to a 53% bulk density reduction. Using roughly 13% of the 5 lb/ft$^3$ expanded perlite results in about a 43% reduction in bulk density. Using roughly 5% of the 5 lb/ft$^3$ expanded perlite results in about a 37% reduction in bulk density.

In addition to the light-weighting material chosen, the bulk density of the composites can be adjusted by manipulating the agglomeration process to increase or decrease pore size within the particle. Agglomeration parameters will be discussed in more detail below.

Heavyweight materials may be added to the light-weighted composite when it is desirable to have heavier particles. Heavy particles may be useful, for example, when the particles are used in an outdoor application in which high winds could blow the particles away from the target zone. Heavier particles also produce an animal litter that is less likely to be tracked out of a litter box. Illustrative heavyweight materials include but are not limited to sand, iron filings, etc.

Illustrative materials for the performance-enhancing active(s) include but are not limited to antimicrobials, odor absorbers/inhibitors, binders, fragrances, health indicating materials, nonstick release agents, superabsorbent materials, and mixtures thereof. One great advantage of the particles of the present invention is that substantially every composite particle contains active, or in the case of a composite blend, the actives are substantially distributed throughout the final product.

Antimicrobial actives include boron containing compounds such as borax pentahydrate, borax decahydrate, boric acid, polyborate, tetraboric acid, sodium metaborate anhydrous, boron components of polymers, and mixtures thereof.

One type of odor absorbing/inhibiting active inhibits the formation of odors. An illustrative material is a water soluble metal salt such as silver, copper, zinc, iron, and aluminum salts and mixtures thereof. Zinc chloride, zinc gluconate, zinc lactate, zinc maleate, zinc salicylate, zinc sulfate, zinc ricinoleate, copper chloride, copper gluconate, and mixtures thereof are particularly effective. Other odor control actives include metal oxide nanoparticles. Additional types of odor absorbing/inhibiting actives include cyclodextrin, zeolites, activated carbon, acidic, salt-forming materials, and mixtures thereof.

Embodiments where the odor absorbing/inhibiting active is Powdered Activated Carbon (PAC), though Granular Activated Carbon (GAC) can also be used, are disclosed herein. PAC gives more exposed surface than GAC (e.g., ≧80 mesh U.S. Standard Sieve (U.S.S.S.)), and thus has more exposed sites with which to trap odor-causing materials and is therefore more effective. PAC will tend to segregate out of the litter during shipping, thereby creating excessive dust (also known as "sifting"). By agglomerating PAC into the composites (or adding the PAC to the composites by a later processing step), the problems with carbon settling out during shipping is overcome. Additionally, carbon is black in color. Agglomerating the PAC (and/or GAC) into the composite (or adding it to the composites by a later processing step) aids in diluting the black color of the carbon, a factor known to be disliked by cat litter consumers. The above-mentioned benefits of incorporating carbon into the composites are true for composite blends, as well. Generally, the mean particle diameter of the carbon particles used is less than about 500 microns, but can be larger. One embodiment utilizes PAC having a particle size about 150 microns (~100 mesh U.S.S.S.) or less. Another embodiment utilizes PAC having a particle size in the range of about 25 to 150 microns, with a mean diameter of about 50 microns (~325 mesh U.S.S.S.) or less.

The active may be calcium bentonite added to reduce sticking to a litter box.

The active may also include a binder such as water, lignin sulfonate (solid), polymeric binders, fibrillated Teflon® (polytetrafluoroethylene or PTFE), and combinations thereof. Useful organic polymerizable binders include, but are not limited to, carboxymethylcellulose (CMC) and its derivatives and its metal salts, guar gum cellulose, xanthan gum, starch, lignin, polyvinyl alcohol, polyacrylic acid, styrene butadiene resins (SBR), and polystyrene acrylic acid resins. Water stable particles can also be made with crosslinked polyester network, including but not limited to those resulting from the reactions of polyacrylic acid or citric acid with different polyols such as glycerin, polyvinyl alcohol, lignin, and hydroxyethylcellulose.

Dedusting agents can also be added to the particles in order to reduce the dust level. Many of the binders listed above are effective dedusting agents when applied to the outer surface of the composite absorbent particles. Other dedusting agents include but are not limited to gums, resins, water, and other liquid or liquefiable materials.

A dye or pigment such as a dye, bleach, lightener, etc. may be added to vary the color of absorbent particles, such as to lighten the color of litter so it is more appealing.

Superabsorbent materials can be used as a performance-enhancing active. Suitable superabsorbent materials include superabsorbent polymers such as AN905SH, FA920SH, and FO4490SH, all from Floerger. Preferably, the superabsorbent material can absorb at least 5 times its weight of water, and ideally more than 10 times its weight of water.

The binding of actives directly to the surface of the pores of the composites, even in extremely low levels, leads to the following benefits:

1. the use of extremely small particle sizes (e.g., for example ranging from nanoparticles to 200 microns) of the active material results in a very high surface area of active while using a very small amount of active,
2. encapsulation of actives prior to attachment to the porous surfaces of the composites can provide a slow release mechanism such that the actives are in a useful form for a longer period of time,
3. segregation of actives from substrates is eliminated; thus, the actives remain dispersed and do not end up on the bottom of the litter container,
4. by using very low levels of expensive actives, the cost of the product is greatly reduced,
5. binding of small particle size actives directly to the substrate surface results in lower dust levels than in bulk added product.

Granular activated carbon (GAC) (20-8 mesh) has been introduced into litter materials. However, the GAC is usually dry blended with the litter, making the litter undesirably dusty. Other methods mix GAC and clay and compress the mixture into particles. In either case, the GAC concentration must typically be 1% by weight or higher to show discernable effects. GAC is very expensive, and the need for such high concentrations greatly increases production costs. Further, because the clay and GAC particles are merely mixed, the litter will have GAC concentrated in some areas, and absent in others.

Surprisingly, low levels of PAC (0.05-5%) have been found to provide excellent odor control in cat litter when they are bound to the porous surfaces of a sodium bentonite clay/expanded perlite composite material. For example, agglomerating small amounts of PAC particles to sodium bentonite/expanded perlite composites using water as binder results in litter materials with superior odor adsorbing performance. In this configuration, the PAC is highly effective at capturing malodorous volatile organic compounds as they escape from solid and liquid wastes due to the high surface area of the PAC, and its preferred location within the porous surfaces of the composites. Alternatively, xanthan gum, acrylic polymer, natural and synthetic polymers, fibrillatable PTFE, or other binders known to those in the art could be used in place of water as the binder.

Methods of Creating Composites and Composite Blends

Methods for creating the composites and composite blends disclosed herein include, without limitation, a pan agglomeration process, a high shear agglomeration process, a low shear agglomeration process, a high pressure agglomeration process, a low pressure agglomeration process, a rotary drum agglomeration process, a mix muller process, a roll press compaction process, a pin mixer process, a batch tumble blending mixer process, an extrusion process and fluid bed processes. All of these are within the definition of "agglomeration" according to the invention.

Extrusion processes typically involve introducing a solid and a liquid to form a paste or doughy mass, then forcing through a die plate or other sizing means. Because the forcing of a mass through a die can adiabatically produce heat, a cooling jacket or other means of temperature regulation may be necessary. The chemical engineering literature has many examples of extrusion techniques, equipment and materials, such as "Outline of Particle Technology," pp. 1-6 (1999), "Know-How in Extrusion of Plastics (Clays) or NonPlastics (Ceramic Oxides) Raw Materials, pp. 1-2, "Putting Crossflow Filtration to the Test," *Chemical Engineering*, pp. 1-5 (2002), and Brodbeck et al., U.S. Pat. No. 5,269,962, especially col. 18, lines 30-61 thereof, all of which is incorporated herein by reference thereto. Fluid bed process is depicted in Coyne et al., U.S. Pat. No. 5,093,021, especially col. 8, line 65 to col. 9, line 40, incorporated herein by reference.

The agglomeration process in combination with the materials used allows the manufacturer to control the physical properties of particles, such as bulk density, dust, strength, as well as particle size distribution (PSD) without changing the fundamental composition and properties of the component particles.

Generally, clay particles (e.g., bentonite powder) are mixed with the light-weighting particles (e.g., expanded perlite) to form a dry mixture, which is stored in a hopper or feeder. The mixture is fed with optional wetting from the hopper into an agglomerating apparatus. Alternatively, the clay particles and light-weighting particles may be fed individually from separate hoppers. The particles of active (e.g., PAC) may optionally be dry blended with either the clay or light-weighting particles or added to the mixture at this time. Alternatively, the particles of active can be stored in another hopper, from which they are fed into the agglomerator. Water and/or binder is sprayed onto the particles in the agglomerating apparatus via sprayers to raise/maintain the moisture content of the particles at a desired level so that they stick together. Some clays, e.g., bentonite, act as its own binder when wetted, causing it to coalesce, so additional binder may not be necessary if the percentage of bentonite used is high enough. Liquid actives or solid actives physically suspended in a slurry can be added by a sprayer.

Depending on the agglomeration parameters chosen, the composites tumble off upon reaching a certain size. At this point, i.e., prior to drying, if a drying step is employed, the particles typically have a high enough moisture content that they are malleable and can be formed into any desired shape. If the composites are substantially spherical in shape when they leave the agglomerator, such as with pan agglomeration, molding, compaction, or other processes known in the art, can transform them into non-spherical shapes such as, for example, ovals, flattened spheres, hexagons, triangles, squares, etc. and combinations thereof. The composites are then dried, if necessary, to a desired moisture level by any suitable mechanism, such as a rotary or fluid bed drier.

In one embodiment, the moisture content of the composites is less than about 15% by weight, generally in the range of 8-13% by weight. At the outlet of the dryer, the particles are screened with sieves or other suitable mechanism to separate out the particles of the desired size range. In another embodiment, e.g., roll pressing, no drying is necessary, but the agglomerates are fed into a grinder after the agglomerator to form composites of suitable size which are then screened as described above. In one embodiment, the selected particle size range is about 10 mm to about 100 microns. In another embodiment, the size range is about 2.5 mm to about 100 microns. Preferred particle sizes for use as animal litter are in 12×40 mesh (1650-400 microns) range. The exhaust from the dryer is sent to a baghouse for dust collection.

Alternatively, the performance-enhancing active can be physically dispersed along pores of an agglomerated composite by suspending an insoluble active in a slurry and spraying the slurry onto the particles. The suspension travels into the pores and discontinuities, depositing the active therein.

Additional actives such as borax and fragrance can be added to the particles at any point in the process before, during and/or after agglomeration. Also, additional/different actives can be dry blended with the particles.

Pan Agglomeration

The pan agglomeration process intrinsically produces agglomerates with a narrow particle size distribution (PSD). The PSD of the agglomerates can be broadened by utilizing a pan agglomerator that continuously changes angle (pivots back and forth) during the agglomeration process. For instance, during the process, the pan could continuously switch from one angle, to a shallower angle, and back to the initial angle or from one angle, to a steeper angle, and back to the initial angle. This variable angle process would then repeat in a continuous fashion. The angles and rate at which the pan continuously varies can be specified to meet the operator's desired PSD and other desired attributes of the agglomerates.

Pan agglomeration manipulation and scale-up can be achieved through an empirical relationship describing the particle's path in the pan. Process factors that impact the path the particle travels in the pan include but are not limited to pan dimensions, pan speed, pan angle, input feed rate, solids to process liquid mass ratio, spray pattern of process liquid spray, position of scrapers, properties of solids being processed, and equipment selection. Additional factors that may be considered when using pan agglomeration include particle to particle interactions in the pan, gravity effects, and the following properties of the particles in the pan: distance traveled, shape of the path traveled, momentum, rotational spin about axis, shape, surface properties, and heat and mass transfer properties. A more detailed description of the benefits of the pan agglomeration process is contained in pending U.S. application Ser. No. 10/618,401 filed Jul. 11, 2003 and owned by the same assignee. Pending U.S. application Ser. No. 10/618,401 is hereby incorporated by reference in its entirety.

Figure 2:
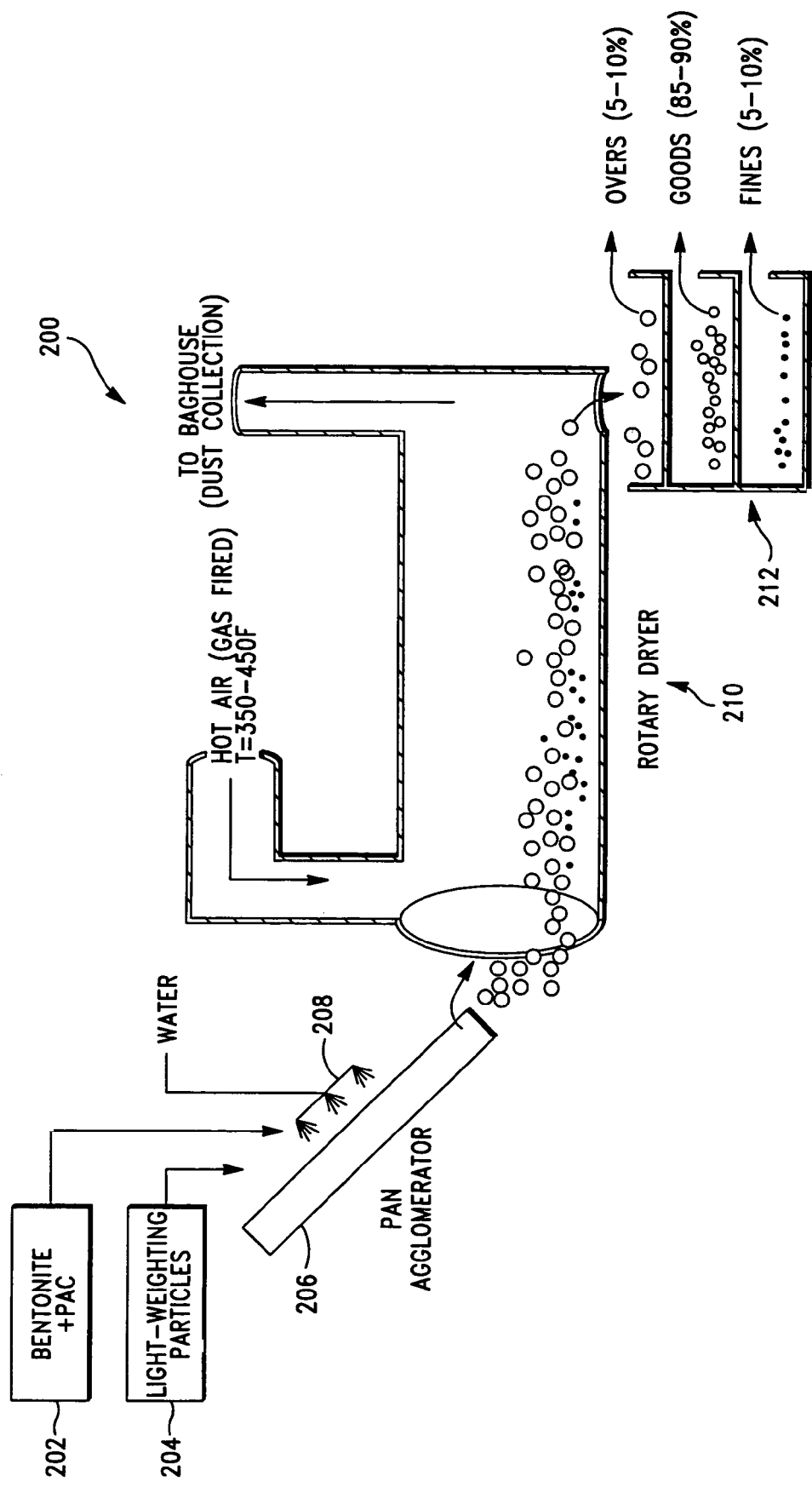
FIG. 2 is a process diagram illustrating an exemplary pan agglomeration process for forming composites.

FIG. 2 is a process diagram illustrating an exemplary pan agglomeration process 200 for forming composites. As shown, clay particles, optionally active particles, light-weighting particles 204 are fed to a pan agglomerator 206. Water is sprayed onto the particles via a sprayer 208 in the agglomerator. The agglomerated composites are then dried in a dryer 210 and sorted by size in a sieve screen system 212. One draw back to the pan agglomeration, is that the light-weighting material tends to blow away when first added to the pan resulting in a need to use more starting material than theoretically calculated. One way of alleviating this problem is to "protect" the light-weighting material by first blending it with a small amount of heavier clay material. This can be accomplished in a variety of ways including any kind of mixing apparatus, e.g., a pin mixer.

Pin/Pan Agglomeration

Figure 3:
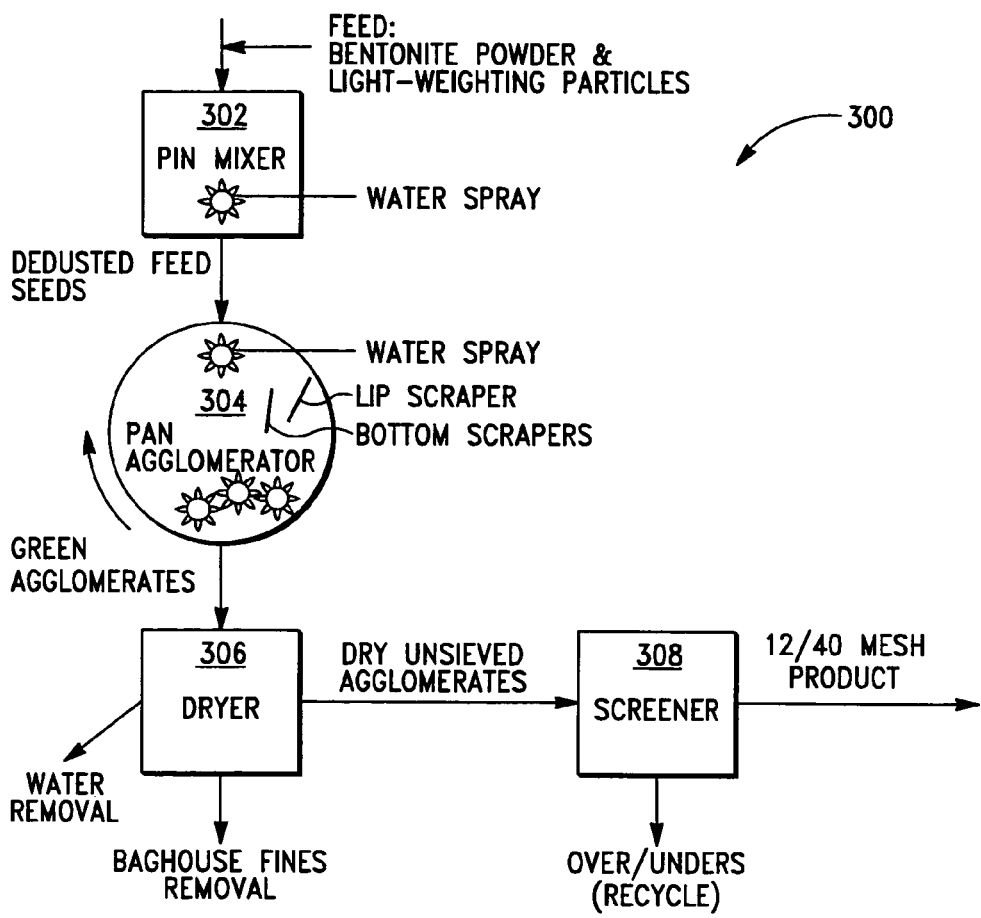
FIG. 3 is a process diagram illustrating an exemplary combination pin-mixer/pan agglomeration process for forming composites.

FIG. 3 is a process diagram illustrating a combination pin/pan agglomeration process 300 for forming composites. Clay particles, light-weighting particles and active are fed to a pin mixer 302. The pin/pan process enables the light-weighting material to first be blended with the absorbent clay material in order to "weigh down" the light-weighting material by forming small "dedusted particle mixtures" which are then fed into a pan agglomerator 304 where they are agglomerated and dried in a dryer 306. It should be noted that almost any kind of mixing apparatus could be used in place of the pin mixer. The dry unsieved agglomerates are sorted in a screener 308 to produce composites in the desired size range. The pin mixer upstream from the pan minimizes dust issues that are often encountered when feeding dry powders to a pan agglomerator exclusively. The pin/pan agglomeration process creates composites that are highly porous and have a relatively narrow particle size distribution. The process has a large capacity per unit operation and is relatively easy to scale up.

Roll-Press

Figure 4:
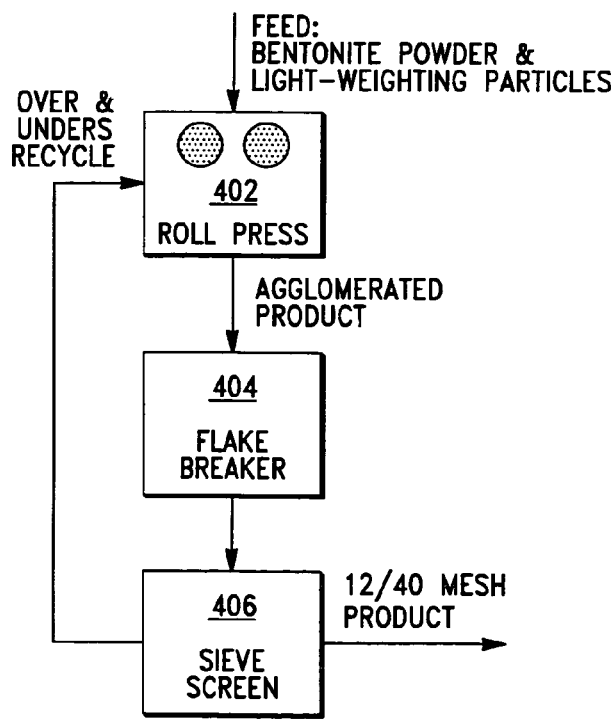
FIG. 4 is a process diagram illustrating an exemplary roll press agglomeration process for forming composites.

FIG. 4 is a process diagram illustrating an exemplary roll press process 400 for forming composites. Clay particles, light-weighting particles and optionally active(s) are fed to a roll press 402 and agglomerated through applied external forces in dies. The agglomerated composites travel through a flake breaker 404 which grinds them to form smaller-sized composites. The composites are then sized with a sieve screen 406. The roll-press requires little to no water addition and therefore no drying is necessary which significantly reduces operating costs. The process is stable, robust and can be automated.

Pin-Mixer

Figure 5:
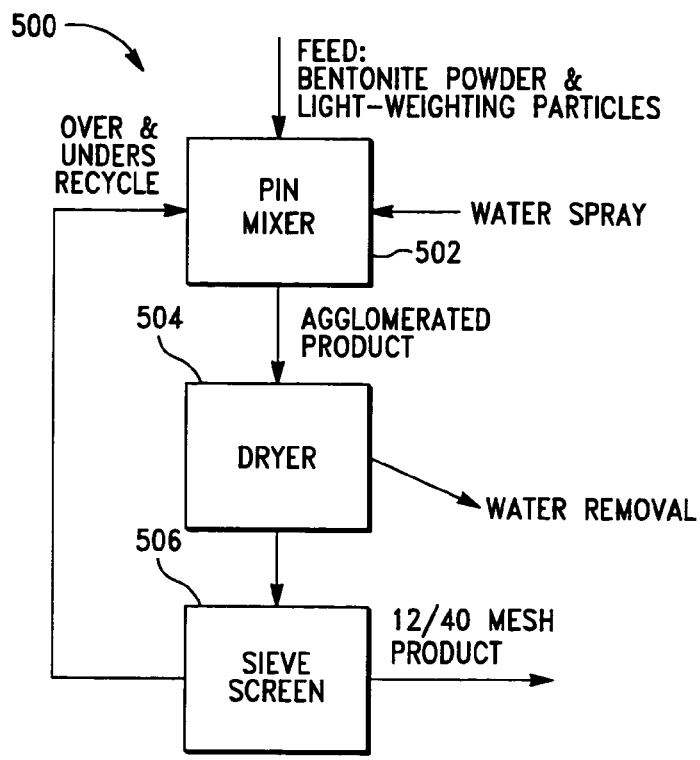
FIG. 5 is a process diagram illustrating an exemplary pin mixer process for forming composites.

FIG. 5 is a process diagram illustrating an exemplary pin mixer process 500 for forming composites. Clay particles, light-weighting particles and optionally active(s) are fed to a pin mixer 502. Water and optional binders are also sprayed into the mixer; the random particle dynamics in the mixer allow for both mixing and agglomeration of the particles into composites. The agglomerated composites are then dried in a dryer 504 and sorted by size in a sieve screen system 506. The pin-mixer uses less moisture that the pan or pin/pan combination, has a large capacity per unit of operation, and automated control is possible.

Mix-Muller

Figure 6:
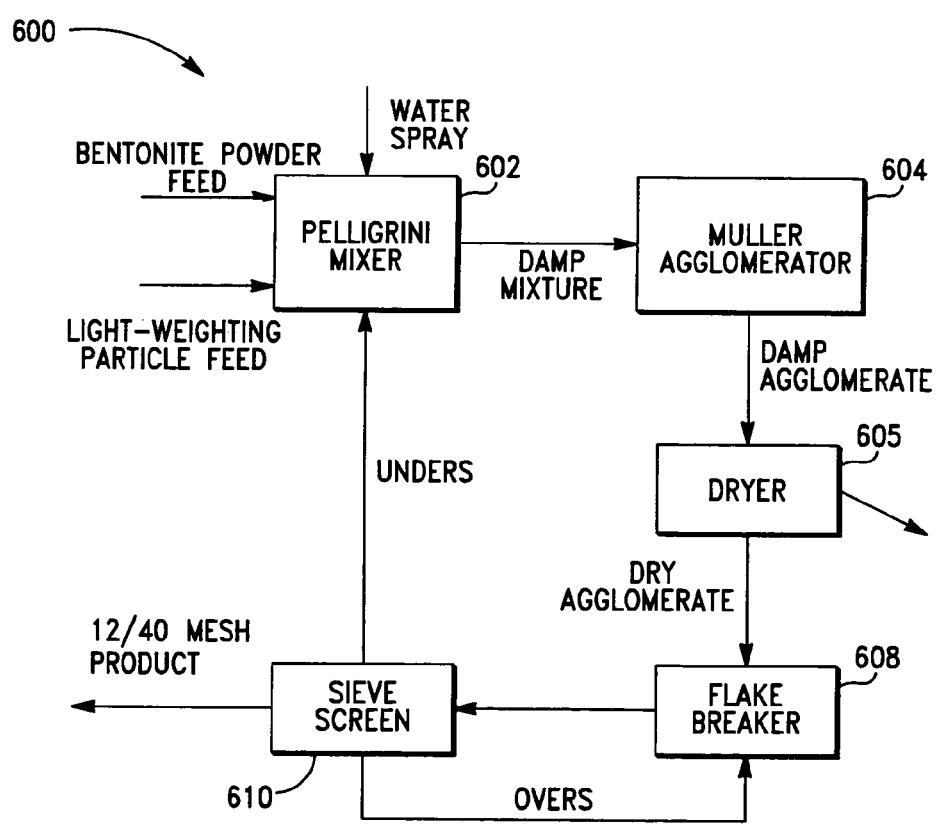
FIG. 6 is a process diagram illustrating an exemplary mix muller process for forming composites.

FIG. 6 is a process diagram illustrating an exemplary mix muller process 600 for forming composites. The various components including clay particles, light-weighting particles and optionally active(s) and water and/or binder are added to a pellegrini mixer 602. The damp mixture is sent to a muller agglomerator 604 where the mixture is agglomerated with some pressure applied but typically not as much as with a roll press. The agglomerated particles are dried in a dryer 606, processed in a flake breaker 608, and then sorted by size in a sieve screen system 610.

Material Properties and Testing Methods

Figure 7:
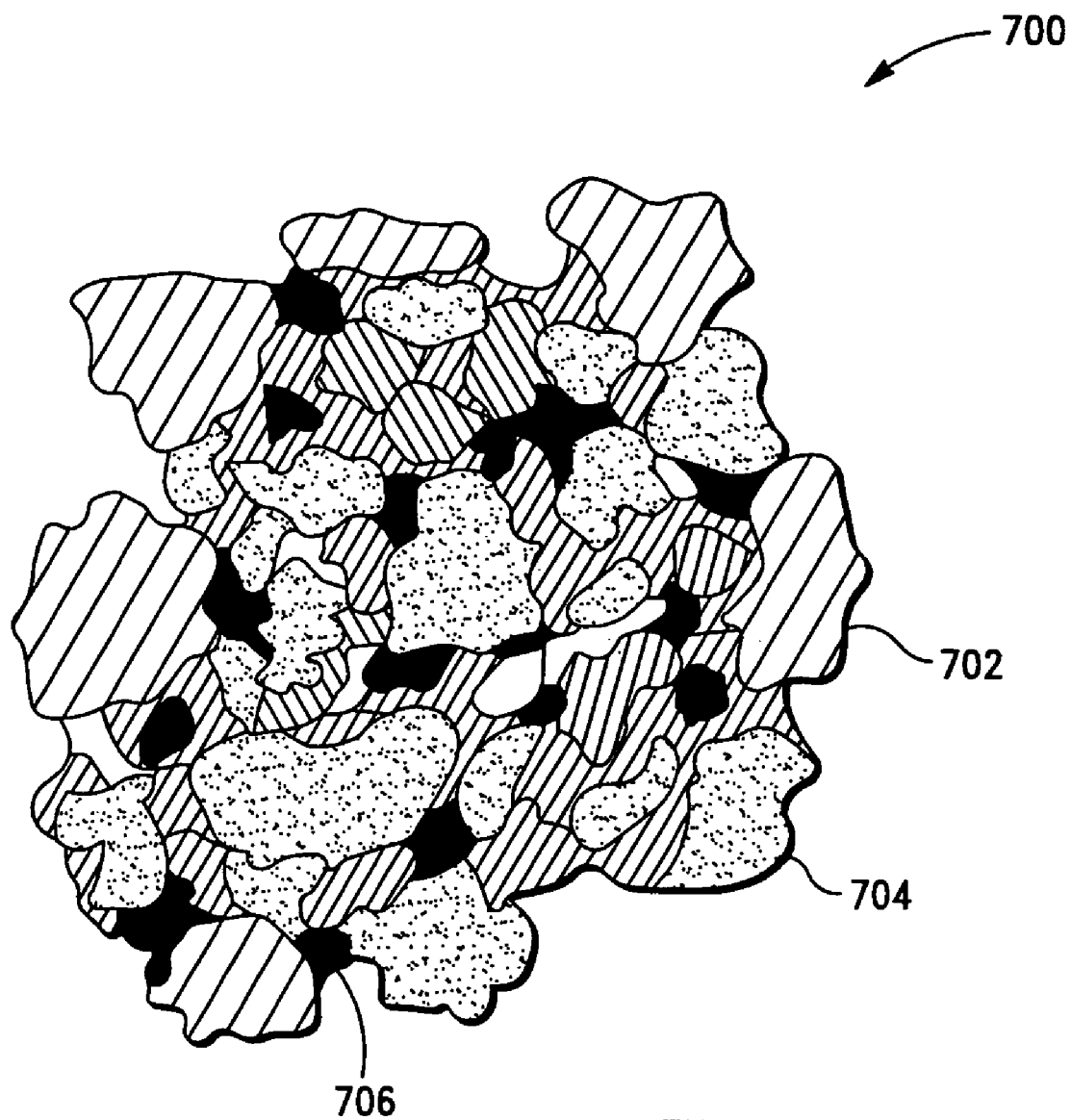
FIG. 7 is an exemplary drawing of an embodiment of a composite particle.

FIG. 7 depicts the structure of an illustrative agglomerated composite particle 700 formed during the process of FIG. 2. As shown, the particle includes clay material(s) 702, light-weighting material(s) 704 and performance-enhancing active 706. Illustrative composites after drying have a specific weight of from about 0.15 to about 1.2 kilograms per liter and a liquid absorbing capability of from about 0.6 to about 2.5 liters of water per kilogram of particles. In one embodiment of the present invention, the composites absorb about 50% or more of their weight in moisture. In another embodiment of the present invention, the composites absorb about 75% or more of their weight in moisture. In a further embodiment of the present invention, the composites absorb greater than approximately 80% of their weight in moisture. In another embodiment of the present invention, the composites absorb about 90% or more of their weight in moisture.

Examples of materials that can be fed to the agglomerator using the processes of FIGS. 2-6 include:

0-100% Bentonite Powder & 0-5% PAC 85-99% Bentonite Powder, 1-15% Expanded Perlite, & 0-5% PAC 45-90% Bentonite Powder, 10-55% Mounds Clay, & 0-5% PAC 75-90% Bentonite Powder, 10-25% Georgia White Clay (GWC), & 0-5% PAC 60-70% Bentonite Powder, 30-40% Sand, & 0-5% PAC 70-80% Bentonite Powder, 20-30% Zeolite, & 0-5% PAC Table 1 lists illustrative properties for various compositions of bentonite-based agglomerated composites. In all cases the balance of material is bentonite clay.

TABLE 1

| Percentage Expanded Perlite | Percentage PAC | Moisture Addition to Feed (wt %) | Agglomeration Process | Bulk Density (lb/ft³) | % Bulk Density Reduction |
|---|---|---|---|---|---|
| 0 | 0.54 | 0 | Roll Press 2000 psi | 61 | 10 |
| 0 | 0.54 | 10 | High shear mixer | 47 | 31 |
| 5 | 0.51 | 15 | High shear mixer | 37 | 46 |
| 14 | 0.51 | 15 | High shear mixer | 31 | 54 |
| 14 | 0.46 | 10 | Roll Press 300 psi | 57 | 16 |
| 28 | 0.39 | 9 | Roll Press 200 psi | 50 | 26 |
| 42 | 0.31 | 13 | Roll Press 100 psi | 43 | 37 |
| 14.4 | 0.54 | 45 | Pin/Pan combination | 31 | 54 |
| 17.1 | 0.54 | 50 | Pin/Pan combination | 32 | 53 |
| 13.4 | 0.54 | 40 | Pin/Pan combination | 41 | 40 |
| 13.4 | 0.54 | 40 | Pin/Pan combination | 39 | 43 |
| 13.4 | 0.54 | 40 | Pin/Pan combination | 41 | 40 |
| 13.4 | 0.54 | 33 | Pin/Pan combination | 35 | 49 |
| 13.4 | 0.1 | 35 | Pin/Pan combination | 38 | 44 |
| 13.4 | 0.1 | 35 | Pin/Pan combination | 37 | 46 |
| 13.4 | None | 40 | Pin/Pan combination | 39 | 43 |

Clump Strength

Clump strength is measured by first generating a clump by pouring 10 ml of pooled cat urine (from several cats so it is not cat specific) onto a 2 inch thick layer of litter. The urine causes the litter to clump. The clump is then placed on a ½" screen after a predetermined amount of time (e.g., 6 hours) has passed since the particles were wetted. The screen is agitated for 5 seconds with the arm up using a Ro-Tap Mechanical Sieve Shaker made by W.S. Tyler, Inc. The percentage of particles retained in the clump is calculated by dividing the weigh of the clump after agitation by the weight of the clump before agitation. Referring again to the table above, note that the clump strength indicates the percentage of particles retained in the clump after 6 hours. As shown, >90%, and more ideally, >95% of the particles are retained in a clump after 6 hours upon addition of an aqueous solution, such as deionized water or animal urine. Note that ≧about 80% particle retention in the clump is preferred.

Malodor Rating

The composites disclosed herein provide meaningful benefits, particularly when used as an animal litter, that include but are not limited to improvements in final product attributes such as odor control, litter box maintenance benefits, reduced dusting or sifting, and consumer convenience. As such, the following paragraphs shall discuss the composites in the context of animal litter, it being understood that the concepts described therein apply to all embodiments of the composites.

Significant odor control improvements over current commercial litter formulas have been identified for, but are not limited to, the following areas:

Fecal odor control (malodor source: feline feces)
Ammonia odor control (malodor source: feline urine)
Non-ammonia odor control (malodor source: feline urine)

Odor control actives that can be utilized to achieve these benefits include but are not limited to powdered activated carbon, granular activated carbon, silica powder (Type C), borax pentahydrate, and bentonite powder.

Figure 8:
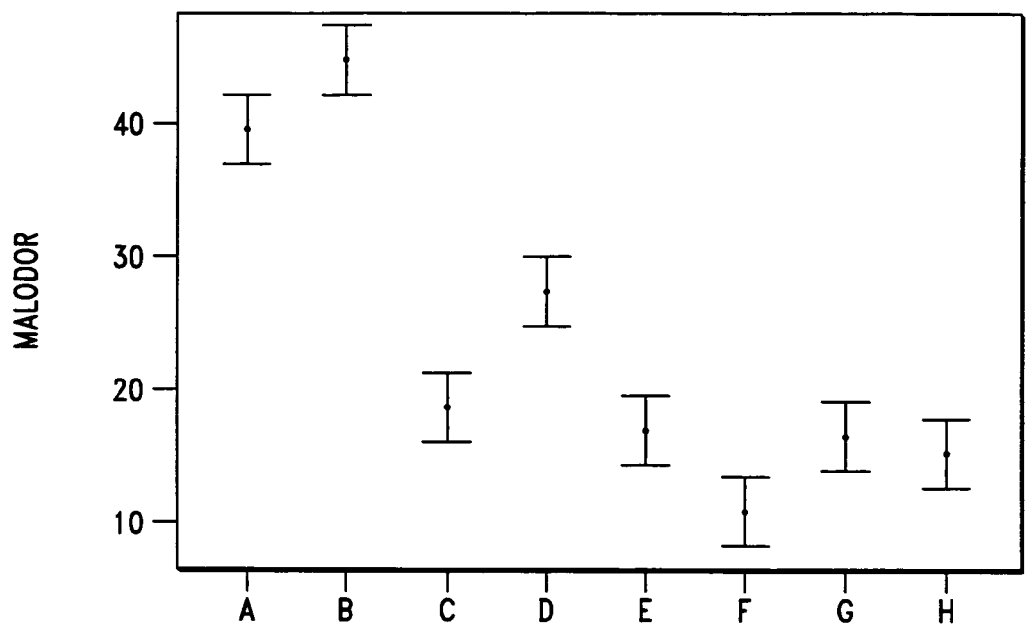
FIG. 8 is a graph illustrating the malodor ratings of embodiments of the present invention.

Because of the unique processing of the composites of the present invention, lower levels of active are required to effectively control odors. In the case of carbon, the effective amount present is 5% or less based on the weight of the particle. In illustrative embodiments, the carbon is present in the amount of 1.0% or less, 0.5% or less, and 0.3% or less, based on the weight of the particle. This lower amount of carbon significantly lowers the cost for the particles, as carbon is very expensive compared to clay. The amount of carbon required to be effective is further reduced because the agglomeration process incorporates the carbon into each particle, using it more effectively. In the case of composite blends, carbon is present in substantially every other particle or every third particle (depending on the composition of the blend). FIG. 8 illustrates the malodor ratings for the animal litter compositions contained in Table 2 below. Two separate sessions were conducted to evaluate each sample. The sessions were averaged and the results plotted graphically in FIG. 8. The percent attrition is a measure of granule strength. It is directionally indicative of porosity, whereby the higher the percent attrition, the higher the porosity and the lower the percent attrition, the lower the porosity. All samples comprise pan agglomerated sodium bentonite.

TABLE 2

| Sample | PAC (wt. %) | Attrition (wt. %) | Bulk Density (g/cc) | Moisture Content (wt. %) |
|---|---|---|---|---|
| A | 0 | 27.8 | 0.79 | 10.6 |
| B | 0 | 4.8 | 0.86 | 10.7 |
| [1]C | 0.15 | 26.8 | 0.79 | 10.6 |
| [1]D | 0.15 | 4.5 | 0.86 | 10.9 |
| [1]E | 0.3 | 25.0 | 0.80 | 10.8 |
| [1]F | 0.3 | 4.36 | 0.87 | 10.5 |
| [2]G | 0.15 | 4.8 | 0.86 | 10.7 |
| [2]H | 0.3 | 4.8 | 0.86 | 10.7 |

[1]PAC dispersed throughout the composite
[2]PAC located on outer perimeter of composite In summary, composites containing PAC have a malodor rating ranging from 11-27, whereas the control that does not contain carbon has a rating of ranging from about 40-45, as determined by a Malodor Sensory Method.

Figure 9:
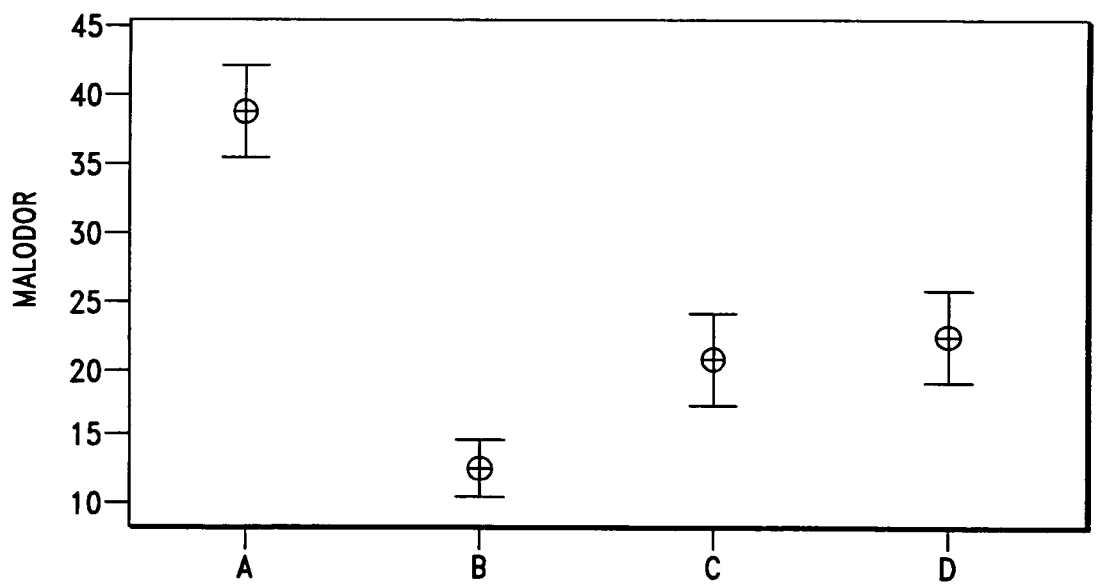
FIG. 9 depicts disintegration of a composite absorbent particle according to an embodiment of the present invention.

FIG. 9 illustrates that even the addition of small percentages of PAC have a profound effect on odor control. Table 3 lists the litter compositions plotted in FIG. 9 (2 reps of each sample were evaluated and averaged).

TABLE 3

| | Composition | | | |
|---|---|---|---|---|
| Sample | Bulk Density (lb/ft³) | Expanded Perlite (wt. %) | PAC (wt. %) | Notes |
| A | 67 | 0 | 0 | 50% agglomerated bentonite blended with 50% non-agglomerate bentonite |
| B | 48 | 4 | 0.5 | pan agglomerated composite |
| C | 59 | 1.28 | 0.2 | 32% Sample B blended with 68% Sample A |

TABLE 3-continued

| | Composition | | | |
|---|---|---|---|---|
| Sample | Bulk Density (lb/ft³) | Expanded Perlite (wt. %) | PAC (wt. %) | Notes |
| D | 63 | 0.6 | 0.1 | 15% Sample B blended with 68% Sample A |

Description of Malodor Sensory Method:
1. Cat boxes are filled with 2,500 cc of test litter.
2. Boxes are dosed each morning for four days with 30 g of pooled feces.
3. On the fourth day the center of each box is dosed with 20 ml pooled urine.
4. The boxes are positioned into sensory evaluation booths.
5. The boxes are allowed to equilibrate in the closed booths for 30-45 minutes before panelist evaluation.
6. The samples are then rated on a 60 point line scale by trained panelists.

The agglomerated mixture of clay plus a light-weighting material containing activated carbon exhibit noticeably less odor after four days from contamination with animal waste as compared to agglomerated particles of clay alone or blends of agglomerated particles of clay and non-agglomerated particles of clay under substantially similar conditions.

Sticking Data

An active may be added to reduce or even prevent sticking of the litter to the litter box. Table 4 shows that samples light-weighted with expanded perlite exhibit less sticking than comparably prepared samples of bentonite clay or bentonite/Georgia White clay combinations. Expanded vermiculite is expected to have a similar anti-sticking effect to expanded perlite. Other useful anti-stick agents include, but are not limited to, hydrophobic materials such as activated carbon, carbon black, Teflon®, hydrophobic polymers and co-polymers, for example poly(propylene oxide).

How tightly swelled litter sticks to a litter box can be measured as a function of the force necessary to remove the 'clump'. One method of measuring this force uses 150 cc of litter and 20 cc of pooled cat urine (from several cats so it is not specific) to form a clump on the bottom of a cat box. The urine causes the litter to clump, and in so doing, the swelled litter adheres to the litter box. The relative amount of force (in pounds) necessary to remove the adhered clump is measured using an Instron tensile tester and a modified scooper.

TABLE 4

| | Removal | Composition | | |
|---|---|---|---|---|
| Sample | Force (units) | Bentonite (wt. %) | GWC (wt. %) | Ex. Perlite (wt. %) |
| A | 2.32 | 100 | 0 | 0 |
| B | 0.91 | 78 | 22 | 0 |
| C | 0.86 | 95 | 0 | 5 |
| D | 0.48 | 87 | 0 | 13 |
| E | 0.52 | 83 | 0 | 17 |

Hydraulic Conductivity

The agglomerated composites allow specific engineering of the particle size distribution and density, and thereby the clump aspect ratio. Thus, hydraulic conductivity (K) values of $\leq 0.25$ cm/s as measured by the following method can be predicted using the technology disclosed herein, resulting in a litter that prevents seepage of urine to the bottom of the box when sufficient litter is present in the box.

Method for Measuring Hydraulic Conductivity

Materials:
1. Water-tight gas drying tube with 7.5 centimeter diameter
2. Manometer
3. Stop watch
4. 250 ml graduated cylinder Procedure:
1. Mix and weigh sample
2. Pour the sample into the Drying tube until the total height of the sample is 14.6 centimeters.
3. Close the cell.
4. Use vacuum to pull air through and dry the sample for at least 3 minutes.
5. When the sample is dry, saturate the sample slowly with water by opening the inlet valve.
6. Allow the water exiting the drying tube to fill the graduated cylinder.
7. Deair the system using vacuum, allowing the system to stabilize for 10 minutes.
8. After 10 minutes, record the differential pressure as displayed by the manometer.
9. Record at least 4 differential pressure measurements, waiting 3 minutes between each measurement.
10. Record the flow rate of the water entering the graduated cylinder.
11. Calculate the Hydraulic Conductivity, K, using Darcy's Law $$Q = -KA(h_a - h_b)/L$$

Q=Flow Rate
K=Hydraulic Conductivity
A=Cross Sectional Area
L=Bed Length
$H_a - H_b$=Differential Pressure One of the distinguishing characteristics of the optimum K value is a litter clump with a very low height to length ratio (flat). By controlling the particle size of the litter, clump strength and clump profile can be controlled. This is important because the smaller the clumps are, the less likely they are to stick to something like the animal or litterbox. For instance, with prior art compacted litter, if a cat urinates 1 inch from the side of the box, the urine will penetrate to the side of box and the clay will stick to the box. However, the materials and processes disclosed herein allows litter particles to be engineered so urine only penetrates about ½ inch into a mass of the particles.

Agglomerated composites according to the present invention also exhibit interesting clumping action. The composites exhibit extraordinary clump strength with less sticking to the box, especially in composites containing bentonite, perlite and PAC. PAC is believed to act as a release agent to reduce sticking to the box. However, intuitively this should also lead to reduced clump strength, not increased clump strength. The combination of stronger clumps yet exhibiting less sticking to the box is both surprising and counter-intuitive. The result is a litter with multiple consumer benefits including strong clumps, low urine seepage, and little sticking to the box.

While not wishing to be bound by any particular theory, the increased clump strength is believed to be due to at least some of the PAC-containing composites "falling apart" and releasing their bentonite particles to reorder themselves, and this 'reordering' produces a stronger clump. This "reordering" creates a network of softened agglomerated particles where broken particle pieces are attaching to others and creating a web of clumped material. Note however that the composites described herein should not be limited to clumping or scoopable particles as those properties tend to depend on the type of absorbent clay particles chosen.

As mentioned above, the composites have particular application for use as an animal litter. The litter would then be added to a receptacle (e.g., litterbox) with a closed bottom, a plurality of interconnected generally upright side walls forming an open top and defining an inside surface. However, the particles should not be limited to animal litters, but rather could be applied to a number of other applications such as:

Litter Additives—Formulated product can be pre-blended with standard clumping or non-clumping clays to create a less expensive product with some of the benefits described herein. A post-additive product could also be sprinkled over or as an amendment to the litter box.

Filters—Air or water filters could be improved by either optimizing the position of actives into areas of likely contact, such as the outer perimeter of a filter particle. Composites with each subcomponent adding a benefit could also be used to create multi-functional composites that work to eliminate a wider range of contaminants.

Bioremediation/Hazardous/Spill Cleanup—Absorbents with actives specifically chosen to attack a particular waste material could be engineered using the technology described herein. Exemplary waste materials include toxic waste, organic waste, hazardous waste, and non-tokic waste.

Pharma/Ag—Medications, skin patches, fertilizers, herbicides, insecticides, all typically use carriers blended with actives. Utilization of the technology described herein reduce the amount of active used (and the cost) while increasing efficacy.

Soaps, Detergents, and other Dry Products—Most dry household products could be engineered to be lighter, stronger, longer lasting, or cheaper using the technology as discussed above.

Mixtures of Different Particles—The composites can be dry mixed with other types of particles, including but not limited to other types of composites, extruded particles, particles formed by crushing a source material, etc. Mixing composites with other types of particles provides the benefits provided by the composites while allowing use of lower cost materials, such as crushed or extruded bentonite. Illustrative ratios of composites to other particles can be 75/25, 50/50, 25/75, or any other ratio desired. For example, in an animal litter created by mixing composites with extruded bentonite, a ratio of 50/50 will provide enhanced odor control, clumping and reduced sticking, while reducing the weight of the litter and lowering the overall cost of manufacturing the litter.

Mixtures of Composites with Actives—The composites can be dry mixed with actives, including but not limited to particles of activated carbon.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A plurality of animal litter composite particles comprising:
a homogeneously agglomerated mixture of (1) a plurality of particles of naturally occurring sodium bentonite; (2) a plurality of particles of at least one light-weighting material, said agglomerated mixture suitable for use as an animal litter; and (3) a plurality of particles of powdered activated carbon (PAC) incorporated into said agglomerated mixture, wherein said agglomerated mixture is agglomerated via a tumble/growth pan agglomeration process and a secondary tumble/growth agglomeration process used in combination with the pan agglomeration process wherein the secondary tumble/growth agglomeration process is selected from the group consisting of a pin mixer process, a mix muller process, a rotary drum process, a batch tumble blending mixer process, a fluid bed process and combinations thereof; wherein the tumble/growth agglomeration processes form composite particles having a porous structure wherein at least a portion of the PAC is positioned towards the center of the particle.

2. The animal litter composite particles recited in claim 1, wherein said composite particles comprises between 70-100 wt. % sodium bentonite and between 0-30 wt. % light-weighting materials.

3. The animal litter composite particles recited in claim 1, wherein said particles of sodium bentonite are about 3000 microns or less.

4. The animal litter composite particles recited in claim 1, wherein said particles of a sodium bentonite range from about 25 to about 150 microns.

5. The animal litter composite particles recited in claim 1, wherein said light-weighting material is selected from the group consisting of perlite, expanded perlite, volcanic ash, vermiculite, expanded vermiculite, silica gels, opaline silica, tuff, lightweight agricultural byproducts and mixtures thereof.

6. The animal litter composite particles recited in claim 1, wherein said particles of light-weighting material are about 1500 microns or less.

7. The animal litter composite particles recited in claim 1, wherein said particles of light-weighting material are about 500 microns or less.

8. The animal litter composite particles recited in claim 1, wherein said particles of sodium bentonite range from about 1 to about 100 microns.

9. The animal litter composite particles recited in claim 1, further comprising a performance-enhancing active selected from the group consisting of antimicrobials, odor absorbers/inhibitors other than PAC, binders, fragrances, health indicating materials, nonstick release agents, superabsorbent materials, and mixtures thereof.

10. The animal litter composite particles recited in claim 9, wherein said antimicrobial active is selected from the group consisting of boron containing compounds such as borax pentahydrate, borax decahydrate, boric acid, polyborate, tetraboric acid, sodium metaborate anhydrous, boron components of polymers, and mixtures thereof.

11. The animal litter composite particles recited in claim 1, wherein said light-weighting material is expanded perlite, expanded vermiculite or a mixture thereof.

12. The animal litter composite particles recited in claim 11, wherein said expanded perlite, expanded vermiculite or mixture thereof has a bulk density of between about 5-20 lb/ft$^3$.

13. The animal litter composite particles recited in claim 12, wherein said expanded perlite comprises a combination of hollow spheres and broken spheres when viewed through a microscope.

14. The animal litter composite particles recited in claim 1, wherein said particles of PAC are about 500 microns or less.

15. The animal litter composite particles recited in claim 1, wherein said particles of PAC are about 150 microns.

16. The animal litter composite particles recited in claim 1, wherein said particles of PAC range from about 25 to about 150 microns.

17. The animal litter composite particles recited in claim 16, wherein said particles of PAC have a mean diameter of about 50 microns.

18. The animal litter composite particles recited in claim 1, wherein the PAC is present in 0.05-5 weight percent.

19. The animal litter composite particles recited in claim 1, wherein the PAC is present in 0.05-0.3 weight percent.

20. The animal litter composite particles recited in claim 1, wherein said composite particles have a particle size distribution ranging from 10 mm to 100 µm.

21. The animal litter composite particles recited in claim 1, wherein said composite particles have a particle size distribution ranging from 2.5 mm to 100 µm.

22. The animal litter composite particles recited in claim 1, wherein said composite particles have a particle size distribution ranging from 1650-400 µm.

23. The animal litter composite particles recited in claim 1, wherein said PAC is incorporated into said composite particles after agglomeration.

24. The animal litter composite particles recited in claim 1, wherein said PAC is added prior to said agglomeration, such that the PAC is incorporated into said composite particles via agglomeration.

25. An animal litter comprising:
the animal litter composite particles recited in claim 1, and
a plurality of particles selected from the group consisting of a plurality of composite particles formed by agglomerating at least one absorbent clay material, a plurality of non-agglomerated particles of at least one absorbent clay material, or a mixture thereof.

26. The animal litter composite particles recited in claim 1, having a malodor sensory rating of less than 25 using the Malodor Sensory Method.

* * * * *